No. 709,915. Patented Sept. 30, 1902.
H. W. LEONARD.
CONTROL OF ELECTRIC MOTORS.
(Application filed Aug. 26, 1901.)
(No Model.)
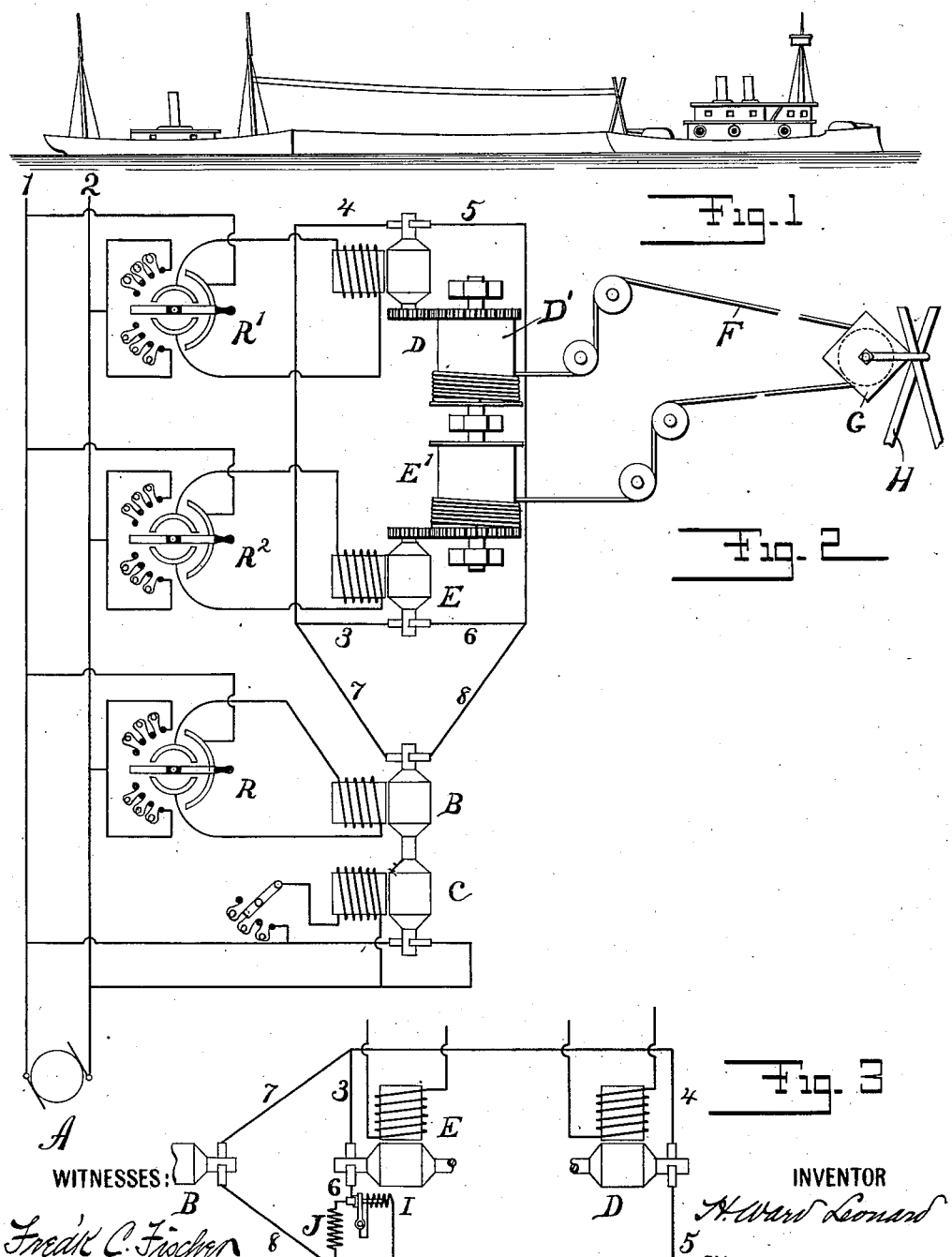

UNITED STATES PATENT OFFICE.

HARRY WARD LEONARD, OF BRONXVILLE, NEW YORK.

CONTROL OF ELECTRIC MOTORS.

SPECIFICATION forming part of Letters Patent No. 709,915, dated September 30, 1902.

Application filed August 26, 1901. Serial No. 73,242. (No model.)

*To all whom it may concern:*

Be it known that I, HARRY WARD LEONARD, a citizen of the United States, residing at Bronxville, in the county of Westchester and State of New York, have invented a certain new and useful Improvement in the Control of Electric Motors, of which the following is a specification.

The object of my invention is to provide a system for controlling the torque and speed of electric motors employed in power systems; and my invention has especial reference to the operation by electric power of cable, chain, belt, or similar conveying apparatus employed for hauling coal, freight, &c., in such a manner that the speed and tension of the cable or similar device can be varied and in some cases reversed in direction of movement under the control of an operator.

As a typical instance of the application of my invention I will describe it as applied to the coaling of war-ships or other vessels at sea.

In carrying my invention into effect I employ two dynamo-electric machines the armatures of which are connected in a local loop, and the armature-terminals of the local source are connected to the loop, so that the armatures of the dynamo-electric machines will be in multiple-arc relation to the local source. The local source is preferably a dynamo-electric machine which may be driven by an electric motor or other form of prime mover. The fields of the three dynamo-electric machines have windings which are separately excited. In the preferred arrangement employed by me one of the dynamo-electric machines connected with the work or load operates as a generator and the other operates as a motor. When my invention is applied to the driving of a cable or similar device, I provide two drums, one for each of the first-named dynamo-electric machines. These drums are driven in such direction that as one drum pays out the cable the other drum takes it up. When employed for coaling at sea, the cable from the two drums may be carried over sheaves at the mast-head of the collier and around one or more sheaves on the towing-vessel which is to receive the coal, such sheaves being suitably elevated, as by means of shear-poles.

In coaling at sea it is important to preserve upon the cable or equivalent device which connects the collier with the receiving vessel an approximately constant tension regardless of the relative motion of the two ships. Heretofore in attempts at coaling vessels at sea by means of cable for hauling the coal in bags a cable extended from the collier to the receiving vessel and then back again to the collier, the bags containing the coal being attached directly to the cable or to a trolley moved by the cable. In these instances the cable was first moved in one direction to convey the full bags of coal to the receiving-ship, and then the cable was caused to travel in the opposite direction in order to return the empty bags to the collier. In some of these attempts three cable-lines were employed in addition to the tow-line, the upper line being what was known as the "sea-anchor" line, the other two cable-lines being the conveying-cable. In all cases it is important to maintain the hauling-cable at a proper tension, and at the same time the driving apparatus must be capable of operating the cable in either direction and at any desired speed within limits. By means of my arrangement of driving-machines I not only accomplish this object, but the variation in tension on the cable due to the rolling or pitching of the vessels is automatically compensated for by the peculiar arrangement of the driving-machines—that is to say, the machines are adjusted in the first instance to operate at a given torque and speed. When the tension of the cable varies, the load on the drums will vary correspondingly, resulting in a corresponding variation of the counter electromotive forces of the machines connected in the local-loop circuit, with the result that the machine operating as a motor will automatically take a greater or lesser amount of energy, producing a corresponding variation in torque and speed, while the machine driven as a generator by the moving cable will produce a greater or lesser amount of energy, according to the speed of the cable, and thus the drums will take up and pay out the cable faster or slower, according to the variation in tension produced by the rolling or pitching of the vessels.

In the accompanying drawings, forming a part hereof, I have illustrated the application of my invention to the coaling of ships at sea.

Figure 1 is a conventional illustration of a ship towing a collier and having a hauling-cable extending from sheaves at the forward masthead of the collier to a suitable sheave on shear-poles erected on the towing vessel. Fig. 2 is a diagram illustrating the arrangement of the main and local sources of energy, the driving-machines, cable-drums, &c., and the circuit connections. Fig. 3 shows a modification of the local closed loop in which the armatures of the driving dynamo-electric machines are connected.

Referring to Fig. 2 of the drawings, A is a source of practically constant electromotive force—such for example, as a dynamo-electric machine—from which extends the circuit 1 2 for supplying current to lamps, motors, or other translating devices. B is a dynamo-electric machine driven as a generator by electric motor C or by any other form of prime mover, such as a steam-engine or gas-engine. The field of dynamo B is partially or wholly separately excited, and, as shown in the diagram, the field-winding is connected across the circuit 1 2, preferably through reversing-rheostat R. D and E are dynamo-electric machines geared or otherwise connected to cable-drums D' and E', respectively, one of said machines operating as a motor and the other as a generator—*i. e.*, the armature geared to the take-up drum acts as a motor-armature and the other acts as a generator-armature. The field-windings of machines D and E are connected in multiple-arc relation across circuit 1 2 through reversing-rheostats R' and R², respectively, although in some instances they may have additional windings and in many instances the reversing-rheostats R' and R² may be omitted. The armatures of machines D and E are connected in a closed loop (indicated by the circuit connections 3 4 5 6) and which loop is connected across the armature-terminals 7 8 of machine B, so that the armatures of machines D and E will be in multiple-arc relation across circuit 7 8. If the fields of machines D and E are continually excited and machine B is continually driven, it will be evident that an operator by manipulating the field reversing-rheostat R can produce at the armature-terminals of machines D and E any desired electromotive force within limits and that the electromotive force can be varied and reversed at will. It will also be evident that by properly exciting the fields of machines D and E the speed of the two armatures can be made equal at all times and that therefore the cable can be paid out from drum E' at the same speed that it is taken up by the drum D', or vice versa. It will also be evident that if the field of one machine is slightly weakened the counter electromotive force of that machine will be reduced below that of the other machine if the speed of the two armatures are held relatively the same by the cable connecting them. Let it be supposed that machine D is driving drum D', so as to take up the cable, the field of that machine being weakened. That machine will tend to run faster in its weakened field and in so doing must drive E faster, thus raising its electromotive force and making it a generator. The result will be that a current will circulate in the local loop 3 4 5 6, this local current being due to the difference in the electromotive forces of the machines D and E. In order to simplify the study of the results, let it be supposed that the distance between the receiving vessel and the collier or, in other words, between the drums D' and E' and sheave G on the shear-poles H is constant and that machine D is operating as a motor driving drum D', so as to take up the cable. The pull thus given to the cable will tend to drive machine E through the unwinding of the cable from drum E'. Disregarding all losses due to friction and heat in the electrical apparatus, it will be evident that the fields of machines D and E can be so adjusted that machine E will be driven at such a speed by the cable that its electromotive force will be exactly equal to the electromotive force supplied by machine B. In that case there will be no current in path 3 6 and current will flow from machine B through path 7 4 5 8. If now the field of D is further weakened, the armature of machine D will tend to speed up, and in so doing must drive drum E' and armature of machine E faster, causing machine E to operate as a generator, which will cause a current to flow in the local loop 3 4 5 6. Machine B will continue to supply another current in the circuit 7 4 5 8 and the two currents will be joined in parallel in the armature of machine D. As above stated, the current in the local loop will be due to the difference between the electromotive forces of machines D and E, and this current can be controlled by the manipulation of rheostats R' and R². If desired, these rheostats may be varied inversely. The current in the local loop will produce a tension upon the cable, and since the current in this loop can be controlled the tension of the cable can likewise be controlled. The speed of the cable can be controlled by controlling the electromotive force of machine B or by simultaneously and similarly varying the fields of machines D and E. To reverse the direction of motion of the cable, the electromotive force of machine B may be reversed by the reversing field-rheostat R or by reducing the electromotive force of that machine practically to zero and then simultaneously reversing the armature connections of machines D and E, or the field connections of those machines may be reversed. If while the cable is in operation with a certain tension upon it the vessels should lurch toward each other, so that the distance between them and the tension of the cable is suddenly reduced, machine D under those conditions will immediately increase its speed and take up the slack in the cable. If the distance between the vessels were to suddenly increase due to rolling or pitching, the current in the local loop will instantly increase due to the increased speed of the cable. Thus it will be seen that the slack in the cable will be automatically maintained practically uniform. If desired, I may wind the field-coils of either or both machines E and D so that they will have some series turns which are normally accumulative to the separately-excited turns, as this makes them act with flexibility over a wider range at any speed, as will be understood by those skilled in the art.

To protect machines D and E against an excessive current, I may connect an automatic circuit-breaker in the local loop—for example, in the circuit 3 6, as shown in Fig. 3. In that illustration I represents an automatic overload circuit-breaker shunted by a resistance J. If the current in the local loop becomes excessive, the switch will automatically open and will insert the resistance in the local loop 3 4 5 6.

In practice rheostats R, R', and R² will be located in close proximity, so as to be within reach of one operator, and these rheostats are preferably located near machines D and E, so that the operator will be in position to observe and control the operation of the entire apparatus. When it is desired to shift the rheostats R' and R² uniformly to control those machines, the resistance and contacts will be arranged in juxtaposition, so that the two contact-arms may be moved by one operating-handle, and when it is desired to vary the fields inversely the field-coil connections, with the resistances, will be made so that as resistance is inserted in the field of one machine resistance will be cut out of the field of the other machine.

Instead of arranging the rheostats as above stated the contact-arms may be connected by suitable gearing so as to move uniformly and with the same or opposite effect, or the contact-arms may be geared so as to move at different speeds according to the conditions of operation.

While the controlling-rheostats are preferably located on the vessel provided with the machines for driving the conveying apparatus, it will be evident that the controllers may be located on the other vessel and connected therewith by an electrical conducting-cable. It will also be evident that a set of controllers may be provided on each vessel. It will also be understood that my invention may be applied to the hauling of cable conveyers on land or for driving any other conveyer system or for driving any form of vehicle or apparatus wherein it is essential to compensate for variations in tension or load.

I do not claim herein the method of controlling electric-power apparatus involved in the operation of the conveyer system above described, since that feature of my invention forms the subject-matter of a divisional application, filed December 10, 1901, Serial No. 85,360.

What I claim is—

1. In a conveyer system, the combination with the conveying apparatus, of two dynamo-electric machines for operating said apparatus, one of said machines operating as a motor to drive the apparatus, and the other machine operating as a generator driven by said apparatus.

2. In a conveying system, the combination with the conveying apparatus, of two dynamo-electric machines for operating said apparatus, and a main source of electric energy to which said machines are connected, one of said machines operating as a motor through energy received from said source to drive the apparatus, and the other machine operating as a generator driven by said apparatus and supplying energy to the motor.

3. In a conveyer system, the combination with the conveying apparatus, of two dynamo-electric machines for operating said apparatus, said machines being connected in series in a closed loop, and a main source to which said loop is connected, one of said machines operating as a motor to drive the apparatus, and the other machine operating as a generator driven by said apparatus, and said motor receiving energy from the source and said generator.

4. In a conveyer system, the combination with the conveying apparatus, of two dynamo-electric machines for operating said apparatus, one of said machines operating as a motor to drive the apparatus, and the other machine operating as a generator driven by said apparatus, and means for controlling the direction of movement of said conveying apparatus.

5. In a conveyer system, the combination with the conveying apparatus, of two dynamo-electric machines for operating said apparatus, one of said machines operating as a motor to drive the apparatus and the other machine operating as a generator driven by said apparatus, and means for controlling the direction of rotation of said machines.

6. In a conveyer system, the combination with the conveying apparatus, of two dynamo-electric machines for operating said apparatus, one of said machines operating as a motor to drive the apparatus, and the other machine operating as a generator driven by said apparatus, and means for controlling the speed of rotation of said machines.

7. In a conveyer system, the combination with the conveying apparatus, of two dynamo-electric machines for operating said apparatus, one of said machines operating as a motor to drive the apparatus, and the other machine operating as a generator driven by said apparatus, and means for simultaneously controlling the speed and direction of rotation of said machines.

8. The combination with a source of electric energy, of three dynamo-electric machines B, D and E, having their field-windings connected with said source, and the armatures of machines D and E being connected in multiple-arc relation across the armature-terminals of machine B, the latter machine and one of said machines D and E generating electric energy and the other machine absorbing electric energy.

9. The combination with a main source of electric energy, of a dynamo-electric machine B, having its field-winding connected with said main source and its armature driven by energy received from said source, and two dynamo-electric machines D and E having their field-windings connected with said source, and their armatures connected in multiple-arc relation across the armature-terminals of machine B, the latter machine and one of said machines D and E generating electric energy and the other machine absorbing electric energy.

10. The combination with a main source of electric energy, of a dynamo-electric machine B, having its field-winding connected with said main source and its armature driven by energy received from said source, and two dynamo-electric machines D and E having their field-windings separately excited from said source, and their armatures connected in multiple-arc relation across the armature-terminals of machine B, the latter machine and one of said machines D and E generating electric energy and the other machine absorbing electric energy.

11. The combination of a source of electromotive force, two dynamo-electric machines whose armatures are in multiple arc across said source, means for varying the electromotive force of said source to vary the speed of the said armatures, the field-windings of said dynamo-electric machines being connected across an independent electromotive force, and means for inductively varying the relative speeds of the two armatures.

12. The combination of a dynamo-electric machine having a separately-excited field-winding and two other dynamo-electric machines whose armatures are connected in multiple-arc relation across the armature-terminals of the first-named dynamo, and both of said machines having separately-excited field-windings.

13. The combination of a local circuit, two dynamo-electric machines whose armatures are connected in said circuit, a cable or equivalent device mechanically connecting the two armatures and means whereby the current in the local circuit can be varied for the purpose of varying the tension of the cable.

14. The combination of a local circuit, two dynamo-electric machines whose armatures are connected in said circuit, a cable or equivalent device mechanically connecting the two armatures, and means for varying the electromotive forces supplied to the two armatures for the purpose of varying the speed of the cable.

15. In a conveyer system connected between moving objects, the combination of a conveying-cable or equivalent device, means for driving said cable, and electrical means for varying or controlling the tension of said cable.

16. In a conveyer system connected between moving objects, the combination of a conveying-cable or equivalent device, means for driving said cable, and apparatus for generating electric energy for controlling the tension of said cable.

17. In a conveyer system connected between moving objects, the combination of a conveying-cable or equivalent device, an electric motor for driving said cable, and electrical means for varying or controlling the speed of said cable.

18. In a conveyer system connected between moving objects, the combination of a conveying-cable or equivalent device, an electric motor for driving said cable, and electrical means for varying or controlling the direction of movement of said cable.

19. The combination of two dynamo-electric machines whose armatures are electrically connected together, a cable or equivalent device mechanically connecting the two armatures and electric means whereby the tension of the cable can be varied at the will of the operator.

20. The combination of two dynamo-electric machines whose armatures are electrically connected together, a cable or equivalent device mechanically connecting the two armatures, and means whereby the relative speeds of the two armatures can be varied at the will of the operator.

21. The combination of two dynamo-electric machines whose armatures are electrically connected together, each armature being geared to a drum, a cable mechanically connecting the two drums, and means for controlling the speed of at least one of the dynamo-electric machines.

22. In an apparatus for coaling at sea, the combination of a moving cable and electric means for controlling the tension of the cable by the generation of electric energy.

23. In an apparatus for conveying materials to or from a vessel which is free to move upon the water, the combination of a cable connecting the vessel with another object above the surface of the intervening water, and electric means for controlling the tension of said cables so as to maintain the cable clear of the water under conditions of relative movement of the vessel and the other object.

24. In an apparatus for conveying materials to or from a vessel which is free to move upon the surface of the water, the combination of a cable, chain, or equivalent device connecting the vessel with another object, a dynamo-electric machine whose armature is mechanically connected with said cable, chain, or equivalent device, and means for controlling the current in said armature whereby the tension of said cable can be controlled.

25. In an apparatus for conveying materials to or from a vessel which is free to move upon the surface of the water, the combination of a cable, chain, or equivalent device connecting the vessel with another object, a dynamo-electric machine whose armature is mechanically connected with said cable, chain, or equivalent device, and electric means for keeping the tension upon the cable sufficiently constant to keep the cable clear of the water when the distance between the vessel and the other object is reduced.

26. In an apparatus for conveying materials to or from a vessel which is free to move upon the surface of the water, the combination of a cable, chain, or equivalent device connecting the vessel with another object, a dynamo-electric machine whose armature is mechanically connected with said cable, chain, or equivalent device, and means for controlling the tension upon said cable when there is a movement of the vessel relative to the other object, by controlling the torque of the armature of said dynamo-electric machine.

27. In an apparatus for conveying materials to or from a vessel which is free to move upon the surface of the water, the combination of a cable, chain or equivalent device connecting the vessel with another object, a dynamo-electric machine whose armature is mechanically connected with said cable, chain or equivalent device, and means for controlling the tension upon said cable when there is a movement of the vessel relative to the other object by controlling the current in one of the elements of said dynamo-electric machine.

This specification signed and witnessed this 23d day of August, 1901.

H. WARD LEONARD.

Witnesses:
JOHN LEONARD KEBLER,
HARRY F. DAVIDSON.